L. A. KRAMER.
CARCASS SCRAPING AND POLISHING MACHINE.
APPLICATION FILED NOV. 26, 1913.

1,096,038.

Patented May 12, 1914.
2 SHEETS—SHEET 1.

WITNESSES:
Chas. A. Becker
G. M. Knott

INVENTOR
Louis A. Kramer,
BY E. E. Huffman
ATTORNEY

L. A. KRAMER.
CARCASS SCRAPING AND POLISHING MACHINE.
APPLICATION FILED NOV. 26, 1913.

1,096,038.

Patented May 12, 1914.
2 SHEETS—SHEET 2.

WITNESSES:
Chas. A. Becker
F. M. Rhorz

INVENTOR
Louis A. Kramer,
BY
E. E. Huffman
ATTORNEY

UNITED STATES PATENT OFFICE.

LOUIS A. KRAMER, OF ST. LOUIS, MISSOURI, ASSIGNOR TO GUS V. BRECHT BUTCHERS' SUPPLY COMPANY, OF ST. LOUIS, MISSOURI, A CORPORATION OF MISSOURI.

CARCASS SCRAPING AND POLISHING MACHINE.

1,096,038.  Specification of Letters Patent.  Patented May 12, 1914.

Application filed November 26, 1913. Serial No. 803,160.

*To all whom it may concern:*

Be it known that I, LOUIS A. KRAMER, a citizen of the United States of America, residing at the city of St. Louis, State of Missouri, have invented a certain new and useful Carcass Scraping and Polishing Machine, of which the following is such a full, clear, and exact description as will enable any one skilled in the art to which it appertains to make and use the same, reference being had to the accompanying drawings, forming part of this specification.

This invention relates to improvements in carcass scraping and polishing machines of the type in which the carcass is loosely supported, rotated and advanced in operative relation with scraping and polishing apparatus without the use of hooks or other devices attached to the carcass, and, more specifically relates to improvements in machines of the character described in Kohlhepp Patent No. 1,012,654.

In the operation of the Kohlhepp machine, it has been found that notwithstanding the downward inclination of the axis of the rotating cylinder which supports and is designed to rotate and advance the carcass past the contained beater shaft, that carcasses sometimes tend to progress backwardly toward the receiving end of the cylinder. This result is no doubt due to the fact that the carcass assumes a position at such an angle to the axis of the cylinder that when rolled on the cylinder's inner surface, its change of position on this surface will be in the direction of the receiving end of the cylinder, notwithstanding the fact that this end is higher than the discharge end.

It is to the provision of means for overcoming the condition just described and to keeping all carcasses in proper position to insure their advancement through the machine, that this invention is particularly directed.

Figure 1:
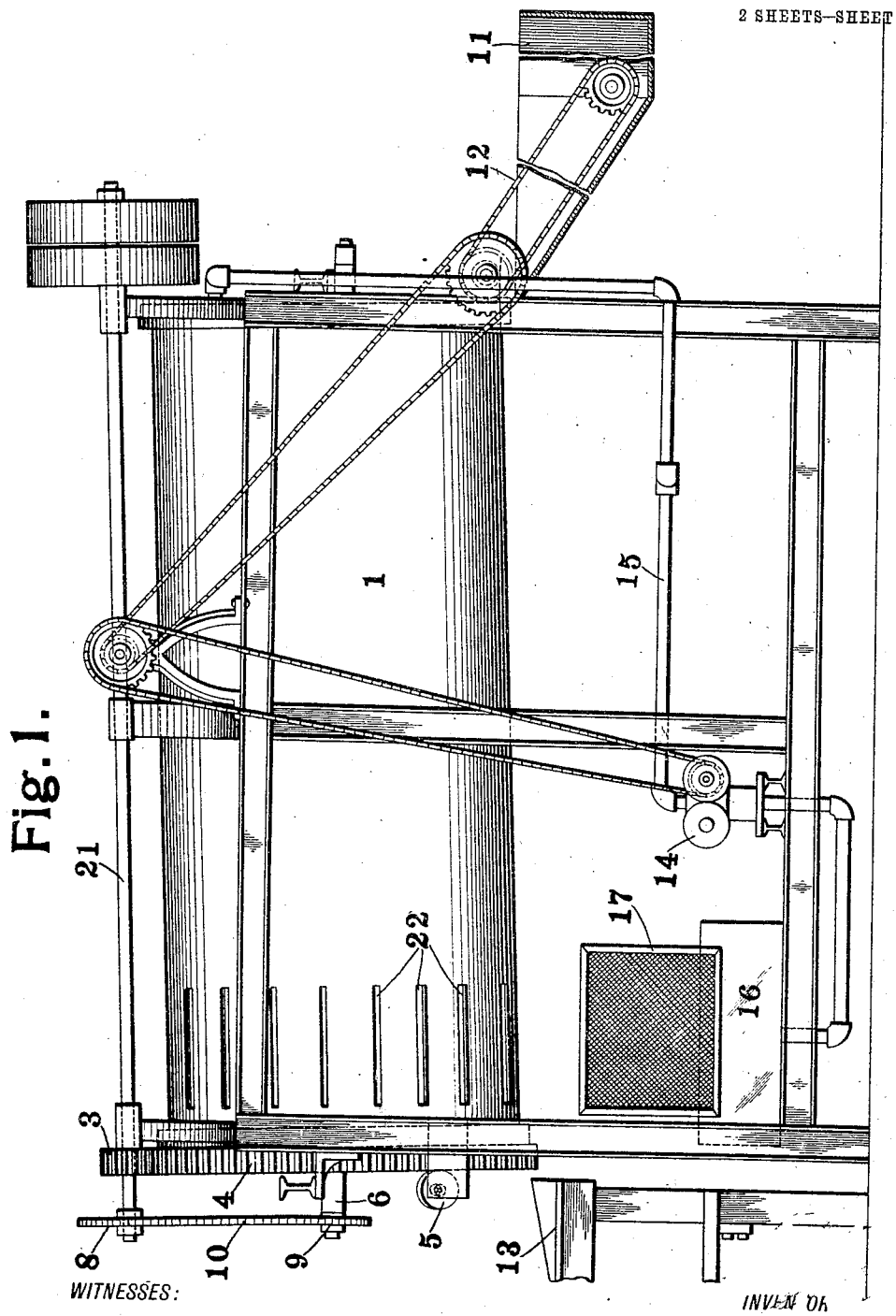
Figure 2:
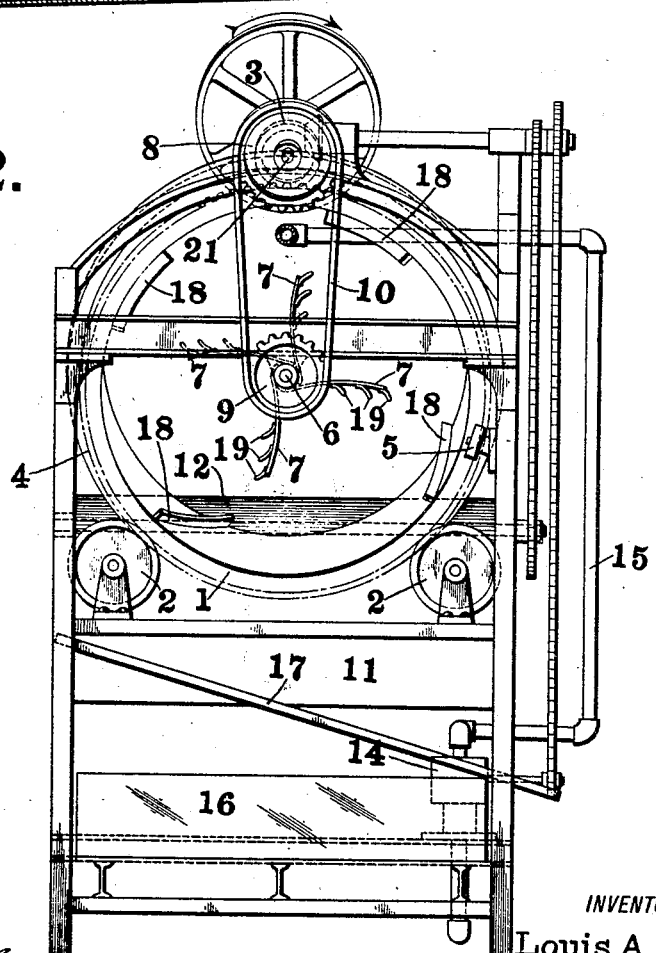

In the accompanying drawings, which illustrate one embodiment of my invention, Figure 1 is a side elevation of a machine of the type referred to; Fig. 2 is an end elevation; and Fig. 3, a view partly in section and partly in elevation, showing the rotating conveyer and contained scraping and polishing device.

The cylinder conveyer 1 rests on rollers 2, supported on a suitable frame, and is rotated from the shaft 21 by means of the pinion 3 which meshes with the gear teeth 4 on the periphery of the cylinder. The conveyer is preferably inclined, as shown, and suitable rollers such as 5 are positioned in the path of the lower end of the cylinder to prevent longitudinal movement. Extending through the cylinder is the shaft 6 to which are attached beaters or scrapers 7. These beaters are preferably flexible and may be constructed of heavy canvas or other suitable material, and are usually provided near the outer end with metal scraping members 19, it being understood that the particular form and construction of the beaters or scrapers 7 form no essential part of my invention. The beater shaft 6 is actuated by means of sprockets 8 and 9, and chain 10, the sprocket wheel 8 in the construction illustrated, being on the same shaft as the pinion 3 by means of which the cylinder is rotated. With this arrangement, the cylinder and beater shaft are actuated in opposite directions.

Adjacent to the receiving end of the cylinder is the scalding tub 11 and the conveyer 12, by means of which carcasses may be conveyed from the scalding tub into the cylinder.

13 is a portion of a bench upon which the carcasses may be discharged.

By means of the pump 14 and the pipe 15, hot water is conveyed from the tank 16, into the cylinder and sprayed upon the carcasses. This water and much of the hair removed from the carcass is discharged from the cylinder through the slots 22, the water returning to the tank 16 and the hair being caught by the screen 17. The pump and the conveyer 12 are driven from the shaft 21 in the manner shown.

The interior wall of the cylinder may be provided with members 18 to assist in turning the carcass. These members 18 may be of any suitable pitch or straight and extending parallel with the axis of the cylinder.

The operation of the machine in scraping and polishing hogs will now be described.

Figure 3:
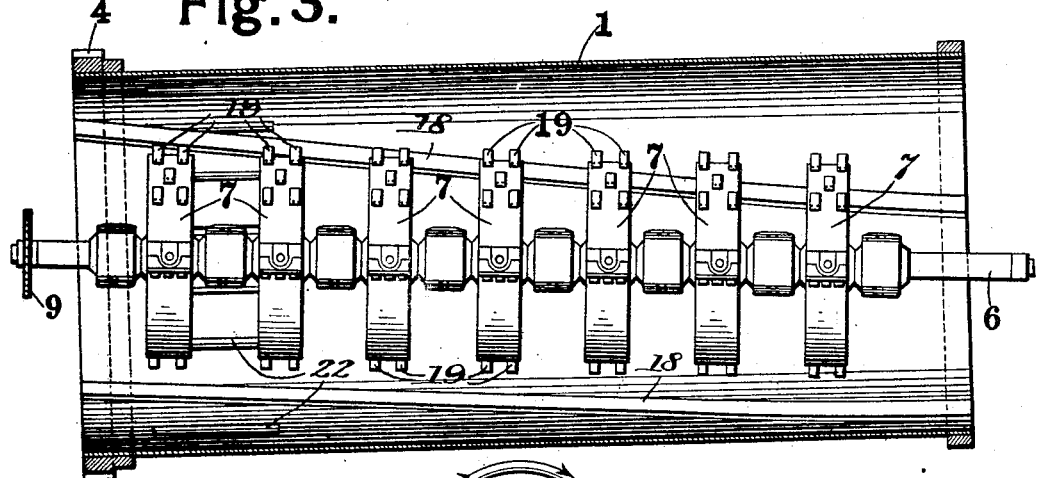

It will be noted in Fig. 3 that, while the cylinder conveyer is shown as inclined horizontally, the beater shaft 6 is substantially level and the beaters themselves extend a substantially uniform distance radially from this shaft. When the carcass is delivered into the machine, the beaters strike it and it is simultaneously rotated on account of the turning of the conveyer and thus all parts of the carcass are successively exposed to the operation of the scrapers. It will be noted, however, that on account of the inclination of the cylinder with reference to the beater shaft, the portion of the carcass nearest the receiving end of the machine will be struck by the beaters at a lower point than other beaters are simultaneously striking the carcass with the result that a greater displacing effect will be exerted on one end of the carcass than on the other. Referring to Fig. 2 and assuming that the cylinder is driven in a counter-clockwise direction, as seen from the delivery end of the machine, the beaters being simultaneously driven in a clockwise direction,—should the portion of the carcass nearest the receiving end of the machine tend, for any reason, as it is rolling over and over on account of the rotation of the cylinder, to get into a position at the right of the axis of the cylinder, while the other end of the carcass is either directly under the axis or somewhat at the left of the axis, then the carcass will progress backward, that is, approach the receiving end of the machine. But, the beaters are always striking the portion of the carcass nearest the receiving end of the machine in such a direction as to oppose the assumption by the carcass of the position just described, and the beaters which are simultaneously operating on the other end of the carcass, while having a tendency to displace the carcass in the same direction as the first named beaters, do not have the same degree of influence because they strike the carcass at a higher point. In my machine, the beaters, therefore, operate to either keep the "axis" of the carcass in the plane of the axis of the cylinder or to keep the portion of the carcass nearest the receiving end of the cylinder a little to the left of the portion nearest the discharge end of the cylinder (still viewing the apparatus from the discharge end as shown in Fig. 2). In this last named position, the hog would advance through the cylinder in the direction desired even if the cylinder were level. Since the hog is prevented, in my improved machine, from assuming and maintaining an improper position while passing through the machine, the purpose of my invention is accomplished.

I am aware that modifications may be made in the machine illustrated without departing from the principle of my invention. I, therefore, do not intend that the scope of my invention shall be limited otherwise than by the appended claims.

Having fully described my invention, what I claim as new and desire to secure by Letters-Patent of the United States is:

1. In carcass de-hairing apparatus, a rotatable hollow conveyer for supporting the carcass, scraping members distributed within said conveyer, and means for actuating the scraping members, the lowest limit of travel of the scraping members adjacent to one end of the conveyer being nearer the inner wall of the conveyer than the lowest limit of travel of scraping members adjacent to the other end of the conveyer.

2. In carcass de-hairing apparatus, a rotatable hollow conveyer for supporting and rotating the carcass, a shaft within said conveyer and non-parallel with the axis thereof, and flexible scraping members supported by the said shaft and extending radially a substantially uniform distance therefrom.

3. In carcass de-hairing apparatus, an inclined rotatable cylinder for supporting and rotating the carcass, a shaft within the cylinder and non-parallel with the axis thereof, scraping members supported by and distributed on said shaft and extending radially a substantially uniform distance therefrom.

4. In carcass de-hairing apparatus, a rotatable hollow conveyer for supporting and rotating the carcass, a shaft within said conveyer and non-parallel with the axis thereof, flexible scraping members supported by the said shaft and extending radially a substantially uniform distance therefrom, means for rotating the shaft in one direction, and means for rotating the conveyer in the opposite direction.

5. In a carcass de-hairing apparatus, an inclined, rotatable, hollow conveyer for loosely supporting, rotating and advancing a carcass, carcass scraping members distributed within the conveyer and so arranged that, in operation of the apparatus, the scraping members will themselves tend to maintain the carcass in suitable position with reference to the axis of the conveyer to facilitate its advancement by said conveyer.

6. In a hog de-hairing machine, a rotatable member for conveying a carcass, and a scraping device in operative relation with the carcass as it passes along the conveyer, said scraping device being adapted to exert, in operation, a greater displacing effect upon one end of the carcass than on the other.

7. In a hog de-hairing machine, the combination with a scraping device comprising flexible scraping members rotatable about a common axis, of a rotatable conveyer for loosely supporting a carcass in operative relation with the scraping device and conveying said carcass longitudinally therepast, said scraping devices being arranged to exert a greater displacing effect upon one end of the carcass than the other as it passes through the machine.

8. In a carcass de-hairing apparatus, the combination with a hollow, rotatable conveyer for loosely supporting and advancing a carcass, flexible beaters distributed within the conveyer and movable about a common axis, the lowest limit of travel of beaters adjacent to the receiving end of the conveyer being nearer the carcass supporting surface of the conveyer than the lowest limit of travel of other beaters nearer the discharge end of the conveyer, means for rotating the conveyer in one direction and means for actuating the beaters in the opposite direction.

9. In a hog dehairing machine, the combination with means for rotating and conveying a carcass, of a scraping device in operative relation with the carcass as it advances, said scraping device being adapted to exert, in operation, a greater displacing effect upon one end of the carcass than on the other.

In testimony whereof, I have hereunto set my hand and affixed my seal in the presence of the two subscribing witnesses.

LOUIS A. KRAMER. [L. S.]

Witnesses:
W. A. ALEXANDER,
G. M. SHORE.